UNITED STATES PATENT OFFICE.

ZACHARIAH CARTWRIGHT, OF ILFORD, ENGLAND.

METHOD OF OBTAINING SOLUTIONS OR QUASI SOLUTIONS OF CERTAIN METALLIC OXIDS.

980,143. Specification of Letters Patent. Patented Dec. 27, 1910.

No Drawing. Original application filed June 29, 1909, Serial No. 505,045. Divided and this application filed January 12, 1910. Serial No. 537,763.

*To all whom it may concern:*

Be it known that I, ZACHARIAH CARTWRIGHT, a subject of the King of Great Britain, and resident of 33 Clarendon Gardens, Ilford, Essex, England, have invented a Novel Method of Obtaining Solutions or Quasi Solutions of Certain Metallic Oxids, of which the following is a specification.

The present application is a division of the application entitled a method of obtaining solutions or quasi-solutions of certain metallic oxids, No. 505,045, filed by me June 29, 1909, to which application cross reference is here made, wherein is set forth a novel menstruum for treating metallic oxids, notably those of iron and other metals of the iron group, for the purpose of obtaining a soluble form of certain of these oxids in a chemically inert medium.

My invention relates to a novel process of treating metallic oxids, notably those of metals contained in the iron series viz., iron, manganese, chromium which are insoluble in water and other media chemically indifferent to the said oxids, for the purpose of obtaining what is virtually a soluble form of certain of these oxids in a chemically inert medium.

My invention rests, therefore, upon the discovery I have made of a novel menstruum for the insoluble oxids referred to which, enables them to be applied in the form of permanent suspension or quasi solutions to many purposes to which they have been hitherto inapplicable. By the application of my invention I am furthermore enabled to effect (by taking advantage of the selective action of the menstruum) the separation of the oxids from those impurities with which they are commonly associated and moreover, within certain limits (as hereafter explained) to separate the various oxids from one another.

It is to be understood that although in the following description for the sake of convenience I refer to the mixture of oxid and the saponaceous menstruum as a "suspension", I mean to imply not that it is a solution in the strict sense of the term, but that it is a mixture so intimate that its constituent elements will pass through filter paper together with the soluble fatty acids without separation. Similarly, the term "soluble" as applied to the oxids, is not to be understood in its strict sense but in the sense corresponding to the above definition.

The novel menstruum of my invention may, broadly speaking, be said to consist of an extremely dilute aqueous solution of soap. I wish it to be understood however, that I include in the term "soap" resin soap and aqueous solutions of fatty acids with a sufficiency of alkali to hold the fatty acids in solution. Too great an excess of alkali must be avoided, otherwise more or less rapid precipitation of the oxids ensues. A certain proportion of unsaponified fats or glycerin may be present in the soap-solution without detriment to the process.

In the manufacture of "mottled" soap, it is well known that if iron oxid be employed to produce the "mottling", the greater the proportion of water present the more rapidly does the iron oxid sink to the bottom of the semi-fluid mass. This still holds good for high degrees of dilution of the soapy matter corresponding to 80 or 90 per cent. of water. I have discovered however, that at a point of still more extreme dilution, contrary to what would have been expected, a reversal of this effect manifests itself, experiment showing that a critical point is reached corresponding to a concentration of about 5% of soapy matter beyond which further dilution with water results in a decrease in the rapidity of precipitation.

The increase in what as above stated, may, for convenience sake, be called the suspension of the oxid, consequent on further dilution, is very rapid, a maximum being reached between the limits of 1 and 0.5% concentration. If the soap solution be of 1% concentration, precipitation of the oxid practically ceases, *i. e.* the oxid will remain suspended in, or distributed throughout the soap solution, without any perceptible tendency to become deposited under the action of gravity for a practically unlimited period. The above applies to other oxids besides those of iron, for instance those of manganese and chromium. It is however, only the hydrated oxids which may be suspended, using this term in the sense above indicated, the so-called solubility increasing with the degree of hydration, specific gravity evidently being the determining factor. Since the color of these oxids also depends upon their hydration (the color passing through progressively darker shades when an oxid is dehydrated by ignition) it will be seen that by employing a menstruum of a given predetermined strength, certain one or more lighter (and consequently more brightly colored) oxids can be separated from the heavier (i. e. darker) ones by virtue of the selective solvent action exercised upon them by the menstruum. I have, therefore, discovered a novel menstruum for iron and other oxids which for many purposes may be regarded practically as water, consisting as it does of an extremely dilute aqueous solution of the comparatively inert substance soap, and being therefore a very innocuous vehicle or medium for conveying the oxid. It will be evident that by the use of this menstruum these bodies may be applied to many purposes to which they were hitherto, in the absence of such a menstruum, inapplicable. From this solution the oxids are easily precipitated by the addition of a small quantity of an alkali.

In applying my invention to the removal of impurities such as silica, from a hydrated oxid such as the yellow and the bright red oxid of iron (but not the purple or the black oxid that do not contain a high percentage of combined water) or of manganese, or of chromium, I may proceed as follows. I suspend the finely levigated impure oxid in the prepared menstruum with mechanical stirring. The strength of the menstruum may be anything between the limits, say, of 5 to 0.5%. The mixture obtained as above is allowed to stand, whereupon the impurities, both those such as silica associated with the oxid and those in the water, will precipitate. Too much oxid should, of course, not be introduced into the solution (i. e. not so much as to appreciably affect the fluidity of the mixture) otherwise satisfactory separation will not be obtained. I find 7% of oxid to be about the maximum for good results. As soon as this precipitation has ceased the solution, containing the oxid and a certain amount of the more soluble impurities, is decanted off into another vessel and a small quantity of alkali is then added to it. Both the impurities and the oxid are precipitated, although the latter goes down more slowly and consequently the precipitate obtained will form two distinct layers, whereof the lower layer consists of impurities, insoluble oxids, and the more coarsely powdered oxid, while the upper one consists of practically pure metallic oxid whose precipitation has taken place more slowly. In order to obtain the pure oxid it is only necessary to decant off the menstruum and then to scrape off the upper layer of the precipitate and to thereafter wash the latter with water. I find it preferable, instead of adding the alkali subsequent to the separation of the impurities, to commence with a menstruum containing a somewhat large excess (relatively speaking) of alkali. Such a menstruum may be called a "time solution" since all the oxids will be precipitated from it after a space of, say, two hours and in accordance with the percentage of alkali used. The above operations may be repeated if desired, successive operations yielding a purer or more finely divided precipitate of oxid. The above constitutes a ready and inexpensive method of purifying metallic oxids to be employed in the manufacture of paint and the like.

In order to illustrate what the strengths of the menstruum mean, I will describe what I mean by, say, a 1% menstruum. Dissolve 1 lb. of caustic soda or caustic potash in about 8 lbs. of water, then take 1 lb. of rosin, grease or oil and warm it until liquid, then pour it slowly into the alkali solution, stir up until well mixed and allow to stand for about 7 days, after which boil up and add slowly further water until a quite clear fluid is obtained in 198 lbs. of water; this I call a 1% solution.

My invention finds its most important application in the partial separation (according to color) of mixed oxids from one another, with the ultimate object of applying them as pigments in the manufacture of paints and the like.

Although for the reasons hereinafter specified, it is not practicable, according to the process the subject of my invention, to absolutely separate any required oxid from those others with which it is associated (and which may differ from it either according to the nature of the metals concerned or in their respective percentages of combined water) so as to obtain a single pure oxid of definite composition, nevertheless this is of small consequence, the object in view being simply the assortation of the oxids according to shade so as to obtain samples of the brightest shades suitable for the manufacture of paints.

The process may be described as an empirical one, the problem being to obtain from any given specimen of mixed oxids, a sample or series of samples of mixed oxids of any required shade (the shade being determined by the varying preponderance of the lighter and darker oxids), while the method adopted depends upon the fact that from a solution of the mixed oxids precipitation of the different oxids present takes place in the order of their respective specific gravities.

By this I do not mean simply that precipitation of all the oxids present goes on simultaneously, only with varying rapidity, but that for a given predetermined strength of the menstruum, certain oxids will be thrown down and others will remain behind in solution. As a matter of fact however, rapidity of precipitation does play an important part in the action, that is to say there is no sharply defined limit determining precipitation of one oxid only or, alternately, of that oxid and also the next in order of specific gravity, the reality being that as a given limit is approached not only does the rapidity of precipitation of the heavier oxid increase, but the next in order of gravity also commences to precipitate until when the limit is actually reached both oxids are precipitated with practically equal rapidities. Hence it will be seen that by the application of this principle, it is possible to obtain, from a given specimen of mixed oxids, an infinite number of samples containing progressively increasing proportions of an oxid of any given specific gravity. Since the color of these oxids is darker according as the specific gravity and percentage of combined water is higher, it will be evident that any shade may be obtained within the range of colors presented by the oxids dealt with. In the case of iron and manganese, however, the specific gravities of oxids containing corresponding percentages of oxygen and of combined water do not permit of complete separation by the application of this method.

In carrying out the assortation process I proceed as follows. Suppose it is required to prepare a sample of mixed oxids of an orange-yellow shade. This shade will of course correspond with a certain high percentage of the lighter oxids, the numerical value of this percentage being however of no immediate consequence. The object is to obtain a menstruum of such strength as will dissolve the oxid of lightest color and that proportion of the darker oxids, the presence of which is necessary to impart the shade required to the mixture of oxids dissolved. When a fluid of the required shade is obtained, it is run off, and, if the color is required for the preparation of paint or the like, the whole of the oxids contained in this fluid are thereafter precipitated, washed and dried, and are then ready for the market. In carrying out this process I proceed according to a method of "trial and error", i. e. employing a small test sample of oxid, I commence with a weak menstruum and gradually increase its strength until one of the correct strength is obtained.

It will be observed that, in the foregoing example, the process is worked by "progressive solution." The details of the process are as follows:—I first prepare a menstruum of sufficient strength to dissolve all the oxids contained in the specimen to be treated. This menstruum (which I will refer to as the standard solution) may be of a strength, say of 2%, the precise meaning which this strength implies having been above explained. From this standard solution I then prepare a small quantity of a solution of a strength insufficient to dissolve any of the oxids, and thereafter increase its strength until it is found to hold such of the oxids in suspension as will give the shade required. When a test solution of the required strength has been obtained, its strength can be easily calculated from the proportions of water and standard solution employed. A quantity of the menstruum of the required strength can then be prepared for the purpose of obtaining a pigment of the required shade from the specimen of commercial oxid submitted. All that is necessary is to decant off the solutions of color and to thereafter precipitate it with an alkali, care being taken that only the requisite quantity of precipitant is employed.

Owing to the fact that no two specimens of commercial oxid can ever be relied upon to possess the same uniform composition, and that moreover, no satisfactory method is known of determining such percentage composition, it will be found necessary always to proceed in the above manner by operating first with a test solution. Furthermore, since the foregoing remarks apply with equal force to the soap supplied in commerce (i. e. the percentage of fatty acids and alkali obtainable in solution from any given specimen of soap being indefinite) and moreover, the hardness of the water employed being also a factor which must be taken into consideration, I find it necessary to prepare the soap solution according to the special process above described.

If it be desired to prepare a permanent fluid suspension of an oxid, it is only necessary to employ a menstruum of the maximum suspension power. By this means the insoluble impurities are at once precipitated whereupon the solution of metallic oxid may then be decanted off and be preserved indefinitely. To obviate the consequences of such an excess of alkali in the menstruum as would cause gradual precipitation, advantage may be taken of the fact that certain organic substances, such a sugar, tend to prevent the precipitation of ferric oxid by alkalies.

Claims.

1. A process for separating certain metallic oxids, consisting in placing the said oxids in an aqueous solution having not less than 0.5 per cent. of a saponaceous material; then increasing the percentage slowly to obtain the desired color, then precipitating the oxids in the said solution by the addition of an alkali and then decanting the liquid.

2. A process of separating certain metallic oxids, consisting in placing the said oxids in an aqueous solution having not less than one-half of one per cent. nor more than five per cent. of a saponaceous material; then precipitating the oxids in the said solution by the addition of an alkali thereto; and then decanting the liquid carefully to obtain separate layers of liquid varying in color.

ZACHARIAH CARTWRIGHT.

Witnesses:
 EDWARD GEORGE WHITE,
 ROSE ISABEL PAGE.